United States Patent [19]

Passarella

[11] 4,208,551
[45] Jun. 17, 1980

[54] TELEPHONE LINE BANK AUXILIARY LINE SWITCHING CIRCUIT

[76] Inventor: Thomas M. Passarella, Rte. 1-Box 357, Florence, Ala. 35630

[21] Appl. No.: 955,018

[22] Filed: Oct. 26, 1978

[51] Int. Cl.² .................................................. H04Q 1/14
[52] U.S. Cl. .................................................. 179/98
[58] Field of Search .......... 174/72 A; 361/331, 380, 361/393–395, 412, 413, 414, 415, 425–429, 400; 339/17 L, 17 LM, 17 LC, 17 M, 17 N, 18 B; 179/91 R, 98, 18 F, 18 FA, 99

[56] References Cited

U.S. PATENT DOCUMENTS

| | | | |
|---|---|---|---|
| 2,742,535 | 4/1956 | Blackhall et al. | 179/91 R |
| 3,518,611 | 6/1970 | Shores, Jr. | 179/98 |
| 3,851,114 | 11/1974 | Bush et al. | 179/98 |
| 3,855,427 | 12/1974 | Sinden | 179/98 |
| 3,947,732 | 3/1976 | Cwirzen | 179/98 |
| 3,955,868 | 5/1976 | Kindermann et al. | 179/98 |
| 4,002,856 | 1/1977 | Sedlacek et al. | 179/98 |

*Primary Examiner*—Thomas A. Robinson
*Attorney, Agent, or Firm*—Harrington A. Lackey

[57] ABSTRACT

A plurality of miniaturized auxiliary line switching circuits on circuit boards adapted to be mounted in existing space on a main distributor frame of telephone switching equipment, particularly the Stromberg Carlson XY line finder equipment. Each auxiliary circuit includes a miniaturized line relay coil, cut-off coil and lock-out coil with circuitry for connecting to the eleventh pins on the wire bank of the XY switching equipment. The circuitry also includes a first indicator lamp circuit to indicate normal use of each auxiliary circuit and a second indicator lamp circuit to indicate a lock-out condition in each auxiliary circuit, as well as test points in the line relay circuit and an optional pay-tone switch circuit.

10 Claims, 3 Drawing Figures

TELEPHONE LINE BANK AUXILIARY LINE SWITCHING CIRCUIT

BACKGROUND OF THE INVENTION

This invention relates to telephone line switching circuitry, and more particularly to a telephone line bank auxiliary line switching circuit.

In the Stromberg Carlson XY switching equipment for telephone lines, wire banks having 11 rows or pins are used in the selector circuits, that is the circuits used to process dial signals to connect outside lines.

The Stromberg Carlson relay switches and wire banks are interchangeable between their selector banks and the line (input) banks. However, the eleventh row of pins are not used, or are idle, in the line (input) banks.

SUMMARY OF THE INVENTION

It is therefore an object of this invention to provide miniaturized auxiliary line switching circuits in a compact device which can be installed in a small space upon the main distributor frame of the existing Stromberg Carlson XY line finder equipment, and for connection to, and utilization of, the eleventh row of pins in the line (input) bank. Such auxiliary line switching circuits provide an additional 100 lines for each 1,000 lines presently in service, at considerably less cost than the cost of adding 100 conventional lines and without requiring any additional space either in the equipment or the building.

A typical auxiliary line switching device made in accordance with this invention includes a small bracket having a pair of plug-in receptacles and adapted to be mounted upon the main distributor frame, and a pair of plug-in printed circuit boards having plug-in connectors for engaging the plug-in receptacles of the bracket. Each printed circuit board is designed to contain five identical auxiliary line switching circuits including miniaturized components, such as miniaturized relay coils, resistors and capacitors.

Furthermore, each printed circuit board is adapted to contain a pair of test points and a pair of indicator lamps (LEDS) for each auxiliary circuit on each circuit board. The indicator lamps are designed to indicate if the particular auxiliary line switching circuit is in use or in lock-out condition.

An optional feature of the device is a pay-tone signal circuit including a manually operable switch permitting optional inclusion or exclusion of the pay-tone circuit in each auxiliary line switching circuit.

Each auxiliary circuit includes three structurally identical and interchangeable relay coils to function as a line relay coil, a cut-off relay coil and a lock-out coil, to afford simplicity in installation as well as maintenance.

DESCRIPTION OF THE PREFERRED EMBODIMENTS

Figure 2:
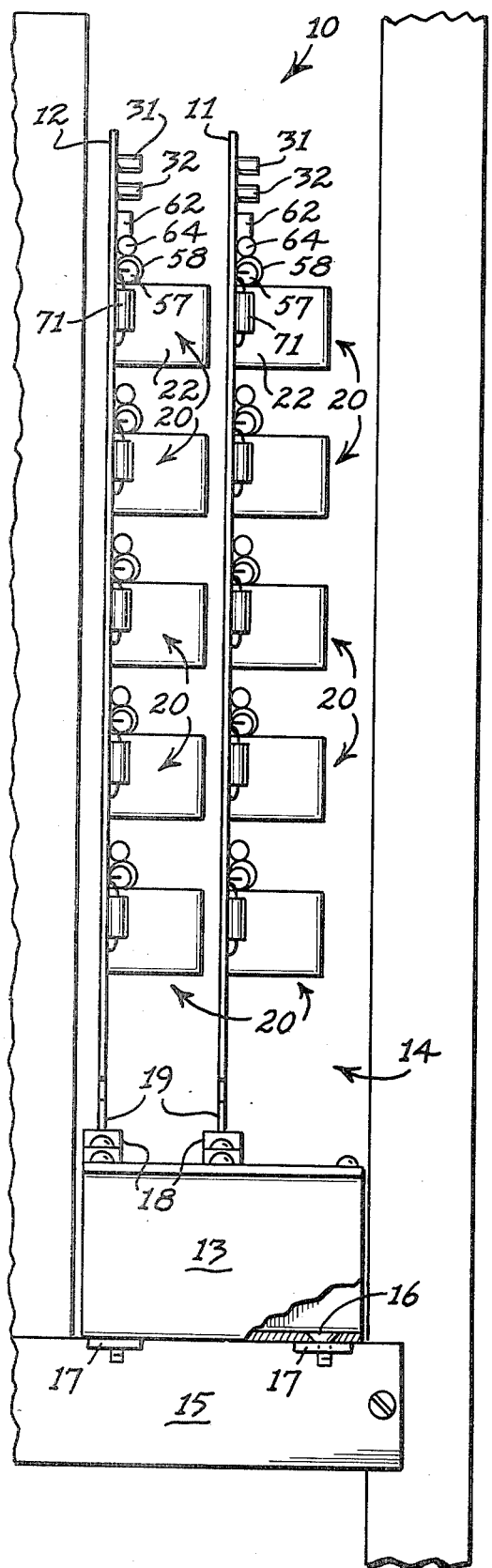
FIG. 2 is a side elevation of the line switching module disclosed in FIG. 1, mounted on the main distributor frame of the line (input) bank, shown fragmentarily.
Figure 1:
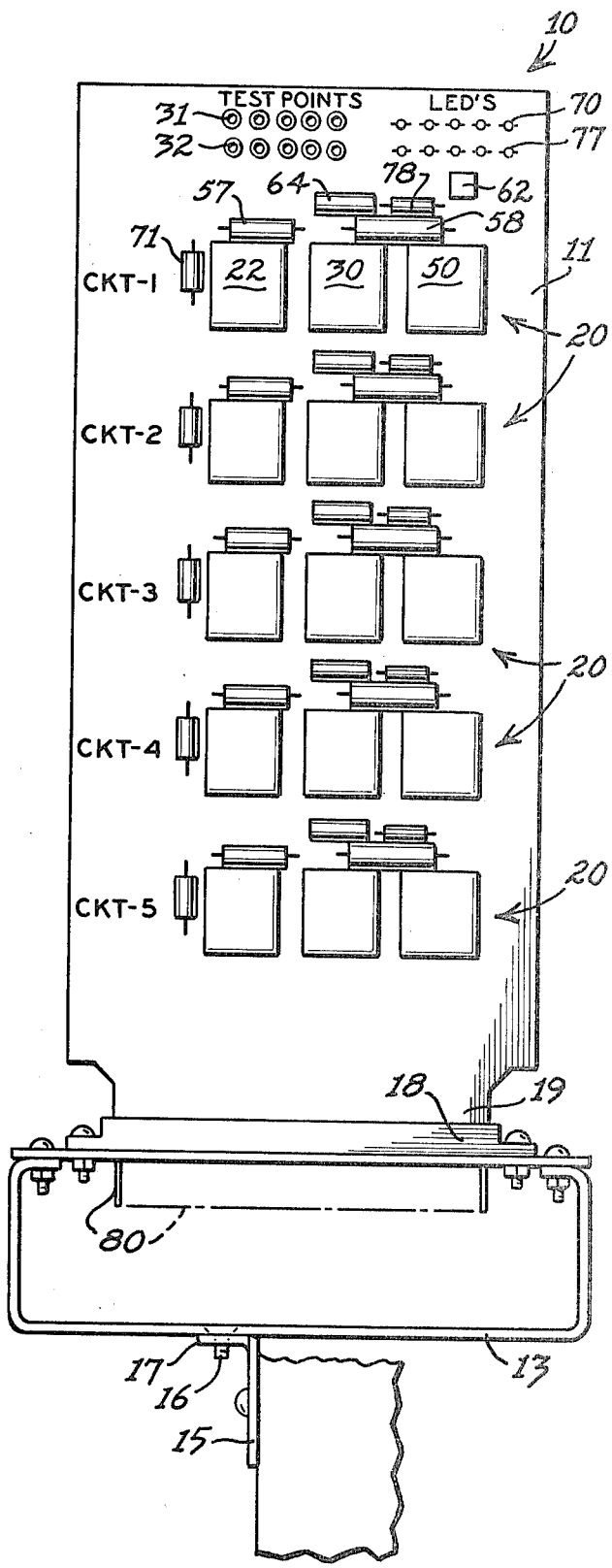
FIG. 1 is a front elevation of an auxiliary line switching module made in accordance with this invention; mounted on the main distributor frame of the line (input) bank of a Stromberg Carlson telephone switching apparatus, shown fragmentarily.

Referring now to the drawings in more detail, FIGS. 1 and 2 disclose an auxiliary line switching device or module 10, made in accordance with this invention, including a pair of printed circuit boards 11 and 12 mounted on bracket 13.

As best disclosed in FIGS. 1 and 2, the bracket 13 may be secured within a line finder bay 14 by attachment to a portion of the main distributor frame 15 by threaded fasteners 16 and support flanges 17.

A pair of receptors 18 are mounted on top of the bracket 13 for mechanically and electrically engaging or receiving the plug-in connector portions 19 of the printed circuit boards 11 and 12.

Five identical auxiliary line switching circuits 20 are affixed to each of the circuit boards 11 and 12. For the sake of clarity, the printed circuits are not disclosed on the circuit boards 11 and 12, but only some of the major electronic components of each circuit 20. However, the complete circuit diagram for one auxiliary circuit 20 is disclosed in FIG. 3.

Figure 3:
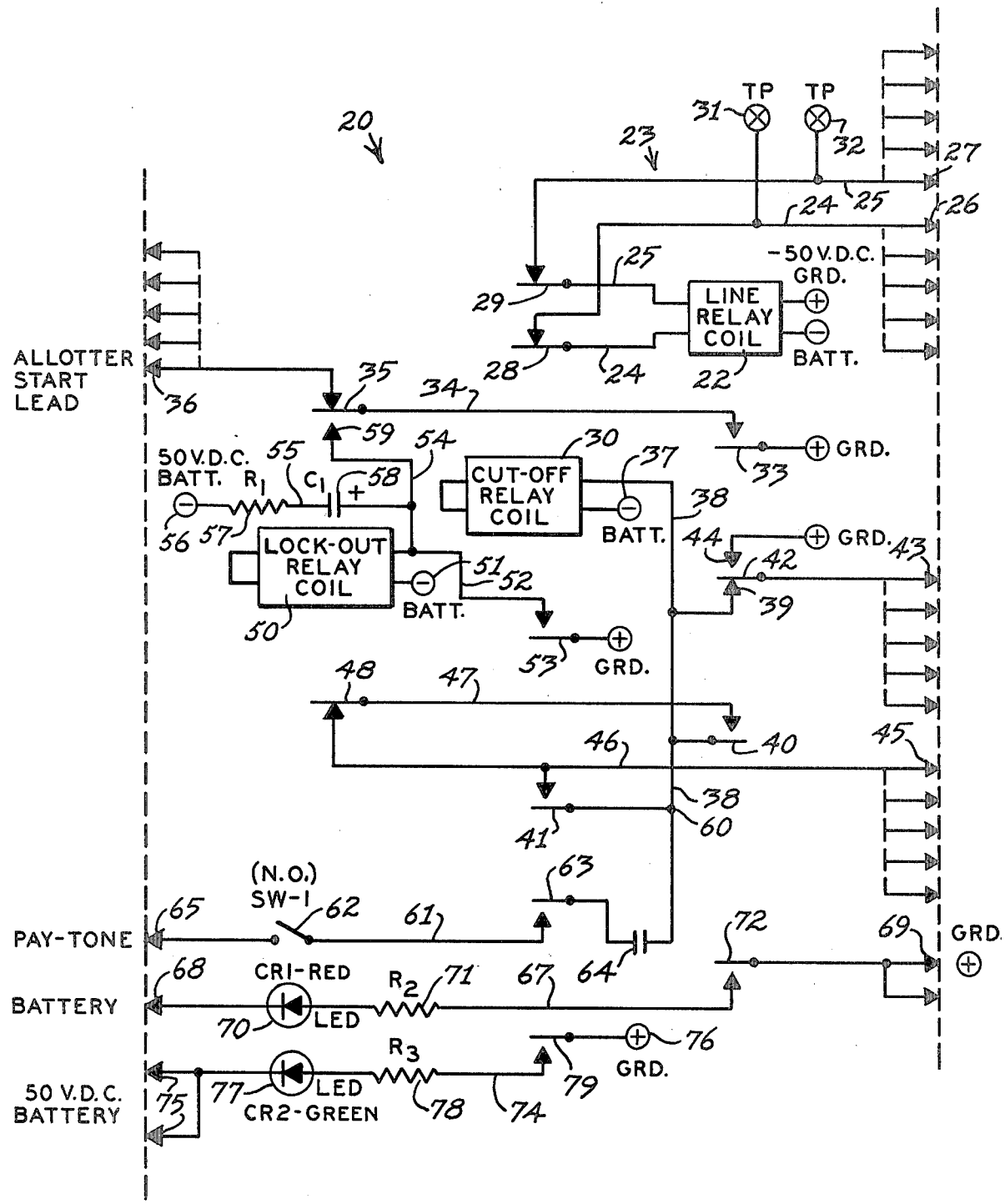
FIG. 3 is a circuit diagram of one of the auxiliary line switching circuits incorporated in the device disclosed in FIGS. 1 and 2.

With reference to FIG. 3, the miniaturized line relay coil 22 is connected through the line relay circuit 23, including power line 24 and ground line 25, to the respective terminals 26 and 27. The terminals 26 and 27 are connected to a corresponding wire bank in the telephone line switching equipment.

Connected in the lines 24 and 25 are the cut-off relay switches 28 and 29, which are controlled by the cut-off relay coil 30. Also connected to the lines 24 and 25 between the terminals 26 and 27 and the cut-off switches 28 and 29 are a pair of test point receptors 31 and 32 for receiving the prongs or terminals of an electrical testing instrument for testing the auxiliary switching circuit 20.

Adapted to be controlled by line relay coil 22 is a grounded allotter start relay switch 33, which is adapted to close the allotter circuit 34 when the line relay coil 22 is energized. The allotter circuit 34 also includes in series an allotter lock-out relay switch 35. The allotter starter circuit 34 is connected to terminal 36, which is connected to the allotter start lead in the conventional XY line finder circuit, not shown.

One end of the coil winding of the cut-off relay coil 30 is connected to a battery through terminal 37. The other end of the relay coil winding is connected through cut-off relay coil circuit 38 to line relay switch terminal 39, line relay switch 40 and to cut-off relay switch 41, connected in parallel.

The terminal 39 is adapted to be made and broken by line relay switch 42 connected to terminal 43, which in turn is connected to the conventional circuitry in the main switching circuit adapted to conduct a busy tone signal when the relay switch 42 is moved to the grounded terminal 44 by energization of the line relay coil 22.

Both line relay switch 40 and cut-off relay holding switch 41 connect the cut-off relay circuit 38 to the terminal 45, which is connected to the sleeve, not shown, on the 11th step of the wire bank, not shown, in the XY switching circuit. Both relay switches 40 and 41 are connected through sleeve line 46, but relay switch 40 is connected to line 46 through line 47 containing a lock-out relay switch 48.

Adapted to control the lock-out switches 35 and 48 is the lock-out relay coil 50. One end of the coil 50 is connected to the battery terminal 51, while the other end of the relay coil 50 is connected to the lock-out circuit 52, including grounded cut-off relay switch 53. The lock-out circuit 52 is connected through lead 54 to a timer circuit 55, which includes, in series, battery terminal 56, time resistor 57 and timer capacitor 58, so that the lock-out relay coil 50 and timer circuit 55 are connected in parallel.

The timer circuit is also connected to switch terminal 59, which is adapted to be contacted by the allotter relay switch 35 when the lock-out relay coil 50 is energized.

The cut-off relay circuit 38 is connected through terminal 60 to pay-tone circuit 61 including, in series, manual switch 62, relay switch 63 and capacitor 64. The circuit 61 is connected to terminal 65, which in turn is connected to the existing pay-tone circuit in the main switching circuit, not shown. The relay switch 63 is closed by energization of the cut-off relay coil 30.

A first visual indicator circuit 67 is connected between battery terminal 68 and ground terminal 69 and includes, in series, indicator lamp 70, preferably an LED (Light Emitting Diode) of red color, resistor 71 and line relay switch 72. Line relay switch 72 is closed when the line relay coil 22 is energized.

A second visual indicator circuit 74 is connected between battery terminals 75 and ground terminal 76, and includes, in series, the indicator lamp 77, preferably an LED of green color, resistor 78 and relay switch 79. Relay switch 79 is closed when the cut-off relay coil 30 is energized.

In the operation of the device 10, the bracket 13 supporting the two printed circuit boards 11 and 12 with the total of 10 auxiliary switching circuits 20 is mounted upon the frame 15 by the fasteners 16, as disclosed in FIGS. 1 and 2. The device 10 is mounted preferably in the line finder bay 14 of the main distributor frame 15 of a telephone XY line circuit, such as a Stromberg Carlson line circuit incorporating wire banks having 11 rows of pins, with the pins in the 11th row being normally idle.

The terminal pins 80 supported on bracket 13 (FIG. 1) are connected to corresponding leads to the main XY line finder circuit, not shown.

When the telephone caller lifts the telephone receiver, which is connected to the terminals 26 and 27 of the auxiliary circuit 20 disclosed in FIG. 3, the line relay circuit 23 is closed to energize the line relay coil 22. Immediately, relay switches 33, 42, 40 and 72 are closed. The closing of relay switch 33 closes the allotter circuit 34 to energize the allotter start lead, which in turn energizes the line finder circuit in the main switch circuitry to start the corresponding XY switch hunting for the 11th pin connected to the particular auxiliary circuit 20 disclosed in FIG. 3. Movement of the relay switch 42 to contact the terminal 44 grounds the terminal 43 to energize the busy-signal circuit. Closing the relay switch 40 places the cut-off relay coil in condition to receive a signal through the terminal 45, after the XY switch has engaged the sleeve of the 11th step or pin on the corresponding wire bank, not shown. Closing the relay switch 72 energizes the red indicator lamp 70 to indicate that the auxiliary circuit 20 is in use.

After the corresponding XY switch engages the 11th step sleeve, a signal is transmitted to the terminal 45, where it is conducted through the line 38 to energize the cut-off relay coil 30, to immediately open the cut-off switches 28 and 29 and de-energize the line relay coil 22. Immediately the relay switches 33, 42, 40 and 72 return to their original inoperative positions, while the relay switches 53, 41, 63 and 79 are closed.

Closing of the relay switch 53 energizes the lock-out circuit 52, which energizes the timer circuit 55 to commence its timing period and permit the timer capacitor 58 to discharge to ground through the grounded relay switch 53. Slightly before the relay switch 40 is opened, the holding relay switch 41 is closed to maintain energization of the cut-off relay coil 30.

If the manual pay-tone switch 62 is closed, the pay-tone circuit 61 is energized by the closing of the relay switch 63.

Closing of the indicator relay switch 79 turns on the green lamp 77, as the red lamp 70 is extinguished.

At the end of the timing period of the timer circuit 55, the lock-out relay coil 50 is energized to open the relay switch 48, and to pull the allotter relay switch 35 down to the switch terminal 59.

After the sleeve terminal 45 loses its signal, the cut-off relay coil 30 will become de-energized to open the switches 53,41, 63 and 79, and to close the cut-off switches 28 and 29, causing the line relay coil 22 to be re-energized. Consequently, the switches 33, 42, 40 and 72 will be re-closed.

Since the allotter relay switch 33 is re-closed, yet the relay switch 35 is open, nevertheless the lock-out relay coil 50 will remain energized because of its alternate path to ground, now through the line 54, switch 35, allotter circuit 34, and relay switch 33.

However, even though the relay switch 40 is re-closed, nevertheless, the cut-off relay coil will be de-energized, because the lock-out relay switch 48 is open.

Since the switch 72 is re-closed and the switch 79 is open, the red light 70 will be re-illuminated, while the green light has been extinguished.

The lock-out relay coil 50 is, of course, designed to be energized after the telephone receiver remains off of the hook too long, without the caller transmitting any dial signals.

It will be noted that the test point receptors 31 and 32 are mounted together at the top of each circuit board 11 and 12, and all of the red and green signal lamps 70 and 77 are also mounted at the top of each circuit board 11 and 12 where they are easily accessible and exposed to view.

As mentioned previously, all of the relay coils 22, 30 and 50 may be identical and physically interchangeable. Some examples of such interchangeable miniature relay coils are coils LBP0042S22 manufactured by CP CLARE of Chicago, Illinois.

Manual pay-tone switches 62 may be mounted at the top of the circuit board 11 or 12 where they are easily accessible and may be actuated to render the pay-tone circuits 61 of all five auxiliary circuits 20 operative or inoperative.

The compactness of the device 10 of supporting ten auxiliary switching circuits 20 is readily apparent in FIG. 2 where the printed circuit boards 11 and 12 are mounted close together and the electronic components 22, 30, 50, 71, 57, 64, 78, and 58 are compactly mounted for each circuit 20.

The device 10 including ten auxiliary circuits 20 readily adds 10 percent capacity to the capability of the lines for an XY switching circuit, with a minimum of additional equipment and installation time, and with no additional space required.

What is claimed is:

1. In telephone XY switching equipment having a main distributor frame and a least one wire bank with a row of idle pins, and an allotter start lead, an auxiliary line switching circuit device comprising:
   (a) a bracket mountable on said main distributor frame,
   (b) a circuit board attached to said bracket,
   (c) at least one miniaturized auxiliary circuit on said circuit board,
   (d) said auxiliary circuit comprising a line relay circuit including a miniaturized line relay coil and a cut-off switch in series, and connector means for connecting said line relay circuit to a wire bank, with a row of idle pins,
   (e) said auxiliary circuit further comprising a miniaturized cut-off relay coil for opening said cut-off switch when said cut-off relay coil is energized,
   (f) said auxiliary circuit comprising an allotter start relay switch controlled by said line relay coil, and connector means for connecting said allotter start relay switch to the allotter start lead.

2. The invention according to claim 1 further comprising a miniaturized lock-out relay coil, a timer circuit connected to said lock-out relay coil, a cut-off coil controlled relay switch connected to said lock-out relay coil and said timer circuit whereby said timer circuit is started when said cut-off coil is energized, and said lock-out coil is energized and said cut-off coil is de-energized at the end of the timing period of said timing circuit.

3. The invention according to claim 2 in which each of said line relay coil, said cut-off relay coil and said lock-out relay coil are identical in construction and physically interchangeable.

4. The invention according to claim 2 further comprising a first indicator circuit including a first indicator lamp and a first indicator relay switch in series, said first indicator relay switch being closed upon energization of said line relay coil, and a second indicator circuit including a second indicator lamp and a second indicator relay switch; said second indicator relay switch being closed upon energization of said cut-off relay coil.

5. The invention according to claim 1 further comprising a pair of test point connectors in said line relay circuit.

6. The invention according to claim 1 further comprising a pay-tone circuit connecting the pay-tone circuit in the XY switching equipment to said cut-off relay coil, a manual pay-tone switch and a relay pay-tone switch in series in said pay-tone circuit, said relay pay-tone switch being closed upon energization of said cut-off relay coil.

7. The invention according to claim 1 further comprising a busy-signal relay switch connected to the busy-signal circuit in the main distributor frame of the XY switching equipment, said busy-signal relay switch being controlled by said line relay coil whereby said busy-signal switch is grounded when said line relay coil is energized, and said busy-signal switch closes a circuit to said cut-off relay coil when said line relay coil is de-energized.

8. The invention according to claim 2 in which said timer circuit includes an electrical power source, a timer resistor and timer capacitor in series with said lock-out relay coil.

9. The invention according to claim 2 further comprising at least one said circuit board, each of said circuit boards having a plug-in connector and a plug-in receptacle for each of said plug-in connectors in said bracket, a plurality of said miniaturized auxiliary circuits on each circuit board.

10. The invention according to claim 9 in which the row of idle pins is the eleventh row of pins on the wire bank of the telephone XY switching equipment, said miniaturized auxiliary circuits comprising ten miniaturized auxiliary circuits.

* * * * *